US008245228B2

(12) United States Patent
Spencer et al.

(10) Patent No.: US 8,245,228 B2
(45) Date of Patent: Aug. 14, 2012

(54) SYSTEM AND METHOD FOR DYNAMICALLY GENERATING ON-DEMAND DIGITAL IMAGES

(75) Inventors: Marc D. Spencer, Bedford, MA (US); Stephen H. Kristy, Fairport, NY (US)

(73) Assignee: LiquidPixels, Inc., Fairport, NY (US)

( * ) Notice: Subject to any disclaimer, the term of this patent is extended or adjusted under 35 U.S.C. 154(b) by 1481 days.

(21) Appl. No.: 11/472,914

(22) Filed: Jun. 22, 2006

(65) Prior Publication Data

US 2006/0238547 A1 Oct. 26, 2006

Related U.S. Application Data

(63) Continuation of application No. 10/017,271, filed on Dec. 14, 2001, now Pat. No. 7,109,985.

(51) Int. Cl.
G06F 9/46 (2006.01)
G06F 15/16 (2006.01)
G06G 5/00 (2006.01)

(52) U.S. Cl. .......................... 718/100; 709/200; 345/619
(58) Field of Classification Search .................... 718/100
See application file for complete search history.

(56) References Cited

U.S. PATENT DOCUMENTS

| | | | |
|---|---|---|---|
| 5,652,887 A * | 7/1997 | Dewey et al. | 719/325 |
| 6,144,797 A | 11/2000 | MacCormack et al. | |
| 6,496,849 B1 * | 12/2002 | Hanson et al. | 709/200 |
| 6,754,785 B2 | 6/2004 | Chow et al. | |
| 6,816,907 B1 * | 11/2004 | Mei et al. | 709/229 |
| 6,964,009 B2 | 11/2005 | Samaniego et al. | |
| 7,109,985 B2 * | 9/2006 | Spencer et al. | 345/418 |
| 2001/0044805 A1 * | 11/2001 | Multer et al. | 707/201 |
| 2002/0099911 A1 * | 7/2002 | Mund et al. | 711/118 |
| 2003/0018732 A1 * | 1/2003 | Jacobs et al. | 709/208 |

OTHER PUBLICATIONS

"Internet Imaging Protocol," Version 1.0, Mar. 27, 1997, Hewlett Packard Company, Live Picture, Inc. and Eastman Kodak Company, pp. i-vi and 7-74.

* cited by examiner

*Primary Examiner* — Kenneth Tang
(74) *Attorney, Agent, or Firm* — Rossi, Kimms & McDowell LLP

(57) ABSTRACT

A system and method is provided that dynamically creates, manipulates and transfers digital images over a communication network on a per request basis in an efficient manner, wherein the composition, format, presentation, and content of the digital images are determined by directives presented at the time of the request. The system includes a parser that takes a request and interprets it into a set of individualized operation commands that will, in sequence, be performed to create or alter an image. The commands derived from the parser are defined as a "job. One or more image processing engines may be called upon as the job is processed to perform requested image transformations. An output formatter takes the resulting processed image and converts it to the desired format stated in the request.

6 Claims, 7 Drawing Sheets

SYSTEM AND METHOD FOR DYNAMICALLY GENERATING ON-DEMAND DIGITAL IMAGES

This is a continuation of application Ser. No. 10/017,271 filed Dec. 14, 2001.

FIELD OF THE INVENTION

The invention relates in general to a system and method for dynamically generating on-demand digital images. More specifically, the invention relates to a system and method for dynamically creating, manipulating and transferring digital images over a communication network on a per request basis, wherein the composition, format, presentation, and content of the digital images are determined by directives presented at the time of the request.

BACKGROUND OF THE INVENTION

The establishment of the Internet has enabled the average individual to retrieve and manipulate vast amounts of information from sources throughout the world. At first, the Internet was primarily used to transfer information in the form of text data. The technology associated with the capture, storage, manipulation and transfer of images over the Internet suffered from a number of limitations including, for example, the expense of electronic imaging equipment and memory, limited computer processing speeds, and the limited data transfer rates associated with available networks.

As technology has progressed, however, many of the limitations described above have been overcome. The average home computer, for example, is now equipped with sufficient processing speed and memory to easily store and manipulate large numbers of images. Data transfer rates have dramatically improved through the use of high speed DSL, cable modems and satellite links. Advances in image capture technologies have also lowered the price of digital cameras and scanners to be competitive with silver halide imaging. The overall result has been an explosion in the use of images to convey information over the Internet.

The use of images to display products in electronic commerce applications is just one example of how image information has become an important factor in communicating information. Early electronic commerce sites included text descriptions of the products being offered for sale. An electronic commerce site selling a book, for example, would provide a written description of the book and might include a link to a review of the book. While the use of text might be sufficient for items such as books, it became apparent that many consumers will not purchase certain items—such as clothing—unless they can see what they are buying. Accordingly, electronic commerce sites began to include an image of the product that could be viewed by the user prior to purchase.

It became further apparent, however, that sales could be increased if consumers could make requests to change the image. For example, the consumer may wish to change the size of the image being displayed, change the color of the item being displayed or may wish to display two items together as a combination. Alternatively, the consumer may wish to add something to the image in order to customize the item being purchased. A typical example of such customization would be allowing the consumer to add a name on the back of a sports jersey.

While it is currently possible to accomplish some of the features recited above using existing technologies, the basic infrastructure of the Internet was not developed to allow for dynamically creating, manipulating and transferring digital images on a per request basis in an efficient manner, wherein the composition, format, presentation, and content of the digital images can be determined by directives presented at the time of the request. Instead, conventional technologies and protocols required that each potentially desired image must be separately created and stored. As a result, a great deal of resources, both in human development time and storage capability, are currently required to create and maintain images for display on Web pages.

As just one further example, many sites are now available to provide current news and information. Such sites will often utilize headlines to emphasis a particular story. The headlines, however, are not supplied in the form of text data for display, but instead, are actually supplied as an image file that has been created by a computer graphic designer. The designer chooses a particular font and style for the headline and creates an image file representative thereof. It is this image file that is displayed on the web page. However, each headline must be independently created and stored. Each time a headline is changed, a designer must revise the image files. As will be appreciated, the constant necessity for file revision is a time consuming and expensive process that is required in order to maintain the site.

In view of the above, it would be desirable to provide a system and method that dynamically creates, manipulates and transfers digital images over a communication network on a per request basis in an efficient manner, wherein the composition, format, presentation, and content of the digital images are determined by directives presented at the time of the request.

SUMMARY OF THE INVENTION

The present invention provides a system and method that dynamically creates, manipulates and transfers digital images over a communication network on a per request basis in an efficient manner, wherein the composition, format, presentation, and content of the digital images are determined by directives presented at the time of the request. The system and method provide a flexible approach that allows for customization and extension to a number of different applications.

In one preferred embodiment of the invention, the system includes a parser that takes a request and interprets it into a set of individualized operation commands that will, in sequence, be performed to create or alter an image. For example, each command may indicate a source for image data to be acquired, perform an image manipulation on a previously acquired image (including such operations as composition, text, drawing, filtering, etc.), modify the state of the request to provide information which may be used by commands later in the request (by performing calculations, database queries, time decisions, if decisions, etc), perform mathematical or positional calculations, create a new image based on data, or indicate disposition of the image. The commands derived from the parser are defined as a "job", namely, a job is composed of a list of commands that will be performed in sequence, and represents the sequential collection of commands that were parsed from the data presented in the request. One or more image processing engines may be called upon as the job is processed to perform requested image transformations. These engines may be added to over time to allow for extension and customization. An output formatter takes the resulting processed image and converts it to the desired format stated in the request.

The requests can be presented in any desired form including, for example, in the form of a URL, via XML, or from an external file. Upon presentation, the request is converted through an extensible look-up-table into a job of commands as described above, where each element in the request is mapped into one or more commands. Each command is then executed by performing the following steps: general metadata expansion; image metadata expansion; arithmetic evaluation; escaped-character expansion; and argument translation. Commands which are macros are expanded, replacing zero or more commands in the job with new commands Each command is then executed, in turn, performing any manipulations that the command is designed to perform. This may include (but not limited to) operations such as image processing, database access, data retrieval, computation, decision making, metadata manipulations, etc.

As each command is processed, images in a stack called the image pool are manipulated by the commands, ultimately resulting in a single result image which is then format converted as requested and sent back to the requesting connection.

The system and method can be utilized in a number of different applications. For example, the system and method can be utilized to create advertisements (visual or audible) targeted for a specific recipient, utilizing information about that recipient to drive the creation or modification of the advertisement in such areas as: Internet radio advertising and building on-the-fly audio streams; Interactive TV and building on-the-fly commercials on a per viewer basis; direct marketing print advertising; and direct marketing HTML email advertising wherein an e-mail sent to a recipient includes images related to product advertisements and allows the customer to dynamically alter the images in order to customize the product being purchased. The type of information known about the recipient can be specific (such as favorite ice cream, current salary, etc.), but may also be as simple as what time zone the recipient is in or what time are they viewing the advertisement.

The system and method can also be utilized to insert data into a pre-existing or an on-the-fly generated image or graphic templates for the purpose of enticing a viewer into pursuing additional information about a product or service. Examples include: inserting up-to-the-second stock quotes into an ad that is advertising a financial services company; inserting up-to-the-second sports scores into an ad which is advertising sporting goods (note that the specific sports selected to display could be driven by information about the viewer); inserting up-to-the-second pricing information regarding an on-going sale or auction; combining images or graphics in order to create a new image for the purpose of enticing a viewer into pursuing additional information about a product or products. Examples of combining images include: combining any viewer selected necktie on to any viewer selected shirt; creating an image of a piece of furniture upholstered in any viewer selected fabric/pattern; creating an image of a house by combining photos of siding, shutters, doors and viewer selected color schemes. While similar capabilities are available in CAD-CAM or desktop software applications, the ability of providing this as a service to many users in an Internet environment has not be possible until now.

Still further, the system and method have applicability to protecting images by the insertion of copyright notices and digital watermarks. Inserting copyright notices or other so called digital watermarks into images is commonplace. Making the watermark (visible or invisible) to a specific recipient, however, has not been possible. The advantage of doing so is to permit the owner of the content (e.g. a digital photo) to determine what recipient has abused his licensing rights if/when the owner discovers the content is being misused.

As will be appreciated by those skilled in the art from the following detailed description, the system and method can also be applied to: generating animated or non-animated imagery where the images are used as banner advertisements; generating animated or non-animated imagery where the images are used as padding or formatting elements within an HTML page; generating animated or non-animated imagery where the images are used as padding or formatting elements within an XML page; generating animated or non-animated imagery where the images are used as content in printed materials; generating animated or non-animated imagery where the images are used to present formatting of text of characteristics not possible in HTML; generating animated or non-animated imagery where the images are specifically formatted to take optimal advantage of the display characteristics available on the device; generating animated or non-animated imagery for the web with any of the above characteristics; and generating animated or non-animated imagery for inclusion in email with any of the above characteristics.

In all cases, since the request may be generated on an individualized basis, and that the request may contain commands which determine and use elements like time and location of the recipient, the resulting image is individually personalized. HyperText References (HREF) within tags contain the location and parameters for a resource to be retrieved. The system and method utilizes the parameters of the HREF within an image tag to convey manipulation instructions which, when performed, will manipulate an existing image or create a new image. The new 'result' image is then transmitted to the calling party (browser, email client, etc) as per usual HTTP activity. There is no limit to the processing capabilities that can be expressed in this manner, nor limitations to the functionality of the system and method.

In one preferred embodiment of the invention to be described below, a dynamic imaging server is provided that includes a parser, a job processor that receives parsed commands from the parser and executes the commands in the form of a job to perform a plurality of operations, at least one image processing engine that performs an operation in response to a command received by the job processor from the parser to process image data, and a formatter that receives the processed image data and formats the processed image data into a desired format. The dynamic imaging server is also preferably provided with a script execution engine capable of executing code during execution of the job by the job processor.

In a further embodiment of the invention, dynamic imaging system is provided that includes a storage device, a dynamic imaging server of the type described above coupled to a storage device, a database accessible by the dynamic imaging server, and network server. The dynamic imaging system is also preferably provided with a request cache that receives image requests and determines whether the image request should be forwarded to the dynamic imaging server for processing.

In a still further embodiment, a dynamic imaging system is provided that includes at least one cluster, wherein each cluster includes at least one cluster master device, and at least one cluster slave device. The cluster master device includes a storage device, a dynamic imaging server coupled to a storage device, a database accessible by the dynamic imaging server, a network server, and a cluster engine. The cluster slave device includes a storage device, a dynamic imaging server coupled to a storage device, and a network server. The cluster engine manages a flow of image requests between the cluster master and the cluster slave. A plurality of clusters can be linked together to provide flexibility to handle any desired application.

Operationally, a method of providing dynamic imaging is provided that includes parsing an image request into a job comprising a plurality of commands, processing the commands to perform a plurality of operations, wherein the operations generate image data that is responsive to the request; and formatting the image data.

Further, a method of providing dynamic imaging is disclosed that includes providing at least one dynamic imaging cluster including at least one cluster master and at least one cluster slave, analyzing an image request with a cluster engine to select either the cluster master or the cluster slave to process the image request, and processing the image request with either the selected cluster master or the selected cluster slave.

Still further, a method of providing dynamic imaging is disclosed that includes providing a plurality of dynamic imaging clusters, wherein each dynamic image processing cluster includes at least one cluster master and at least one cluster slave, analyzing an image request with a cluster engine to select which of the plurality of dynamic image processing clusters will process the request, forwarding the request to the selected dynamic image processing cluster; and processing the image request with the selected dynamic imaging processing cluster.

In one preferred embodiment, at last one of the dynamic imaging clusters comprises a user cluster and at least one of the dynamic imaging clusters comprises a third party cluster, and the third party cluster is utilized to provide overflow capacity processing for the user cluster.

Further features, advantages and applications of the invention will become apparent to those skilled in the art from the following detailed description of the preferred embodiments of the invention.

BRIEF DESCRIPTION OF THE DRAWINGS

The invention will be described in detail with reference to certain preferred embodiments thereof along with the accompanying drawings, wherein.

DETAILED DESCRIPTION OF THE PREFERRED EMBODIMENTS

Figure 1:
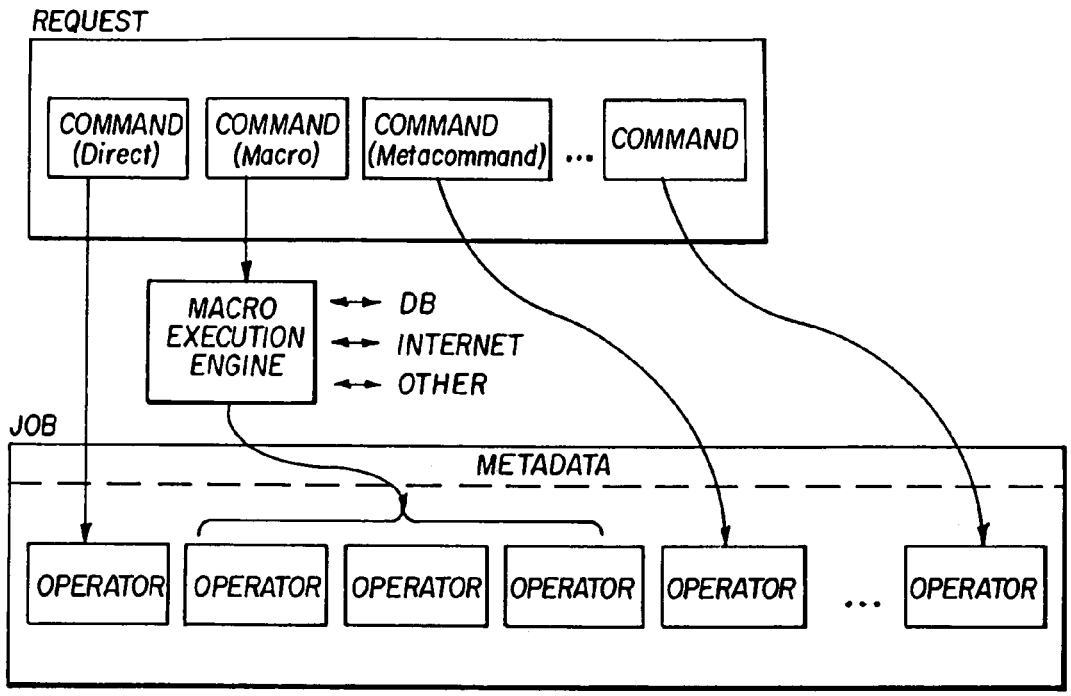
FIG. 1 is a schematic block diagram illustrating command processing in accordance with the present invention.

A system and method is provided that allows users to dynamically create and manipulate images on-demand and in real time. Images are created or altered by sending commands to a dynamic imaging server that performs the necessary command operations and returns a processed image. The system presents many capabilities to the web designer, such as support for all popular image file formats, ability to render and manipulate vector images such as Encapsulated PostScript (eps) and Scalable Vector Graphics (svg), full International Color Consortium (icc) color management, international (Unicode) typographic support, and manipulation of Exchangeable Image File (exif) and International Press Telecomminications Council (iptc) metadata. Metadata is data carried along with an image to convey additional details or characteristics beyond the picture itself. The system assets such as images, image chains, color profiles, and fonts, can be acquired from many sources, for example, over http, ftp, or from an image repository on a server. The assets are processed by requests sent to a dynamic imaging server, wherein the requests are a series of commands that will be described in greater detail below.

Digital images are a primary asset to be utilized by a preferred embodiment of the system, a few basic points regarding digital imaging will be reviewed. A digital image is generally comprised of one or more frames—a series of sub-images contained within one main image—which when rendered represent an array of pixels that can be displayed or printed. In addition to being comprised of frames, images may: be described as pixels or as instructions; contain image-specific metadata; contain esoteric metadata; and have transparent regions known as alpha channels. Metadata is information carried along with an image that may be used for informational purposes. For example, the width of an image, its format, original source, etc., are examples of metadata.

The system may need to acquire and/or create images in order to process a request. As images are introduced by a command in a request, these images reside in an image pool—a temporary collection of images maintained during each request. A separate image pool is created for each request, and is drained when the request is complete. Images in the pool are named so they can be identified and manipulated. Certain commands add images to the image pool, and will accept an optional name argument by which the image in the pool will be known. If two images are named identically, the latter replaces the former in the pool.

Images in the system may have multiple frames. If the file from which an image is retrieved supports multiple frames, it will be added to the pool just as any other image via the source command. Frames may be also added to images already in the pool. Once a multiple-frame image is in the pool, individual frames may be selected with the select command and subsequently manipulated as an independent image.

The system and method employs an image chain to create a desired image. The image chain is a representation of a sequence of steps necessary to create the desired result image. Image chains are built within the system by sending a series of commands referred to as a request. As the request is processed, each command is interpreted, in sequence, resulting in the creation of an image chain. The image chain, along with its associated metadata is contained within a job.

In the preferred embodiment of the system, three types of commands are utilized: direct, macro, and metacommands. Direct commands are the most common, resulting in the addition of an operator to the image chain. Macro commands, may perform additional computation or processing, such as database queries, calculations, etc., before optionally adding zero or more operators to the image chain. Finally, metacommands allow manipulation of non-image data (metadata) associated with the request.

Figure 2:
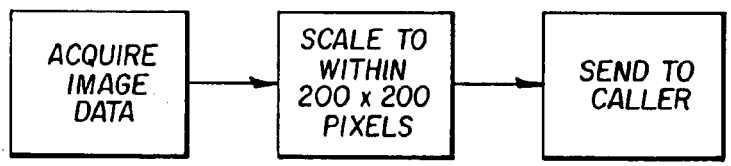
FIG. 2 is a schematic block diagram illustrating a request.

FIG. 1 is a basic block diagram illustrating the command processing structure used to execute commands by a dynamic imaging server in accordance with the present invention. As one simple example, consider the display of an image in a web page within a space two hundred pixels wide and two hundred pixels tall. There are three steps required to process the image: 1) acquire the source image; 2) scale it to the desired size, and 3) send it to the requesting browser in a format the browser understands. These steps are graphically illustrated in FIG. 2, and will result in the creation of a single operator in the image chain as illustrated in FIG. 3.

Image chains themselves are not directly created. Rather, they are represented as a sequence of commands, each with a list of optional arguments. Each command represents one or more operators, macros or metacommands. These commands, in turn, are interpreted to create the image chain. Image chains can be represented in many different ways including, but not limited to, http or xml.

Figure 3:
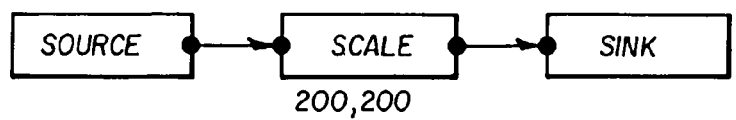
FIG. 3 is a schematic block diagram illustrating an image chain that results from the request illustrated in FIG. 2.

The example depicted in FIG. 3 contains three operators, with the second having two arguments, width and height. This example can be represented with three corresponding commands in an http request. The http syntax for the system is designed to be simple to read and develop. For the technically inclined, the Modified Backus-Nauer form (mBNF) of the http request is listed in the attached Appendix, which forms part of this specification, under "HTTP Syntax Definition", at 187.

Commands are identified by name, and may result in one or more (as in the case of a macro) operators being added to the image chain. Optional named arguments begin with an equals sign '=' and are separated by commas ',' with their values surrounded by square brackets ('[' and ']'). Commands may have zero or more arguments.

commandName=argumentName[value],anotherArg[AnotherValue] . . .

The illustrated embodiment will focus solely on the http representation of system requests. It will be understood, however, that other formats are possible. In the http request form, commands are processed in sequentially, and are separated in the request by an ampersand character '&' as per the http standard for get requests:

commandOne=argOne[valueOne],argTwo[valueTwo]&commandTwo& . . .

For purposes of clarity, requests within the examples may be separated into several lines in this specification.

Now returning to the simple image-scaling example above, a representation of a real system request could be:

source=url[http://www.liquidpixels.net/images/cat.jpg]&
    scale=geometry[200×200]&
    sink From the above, the three commands, source, scale, and sink, together in a single request can be easily seen.

Figure 4:
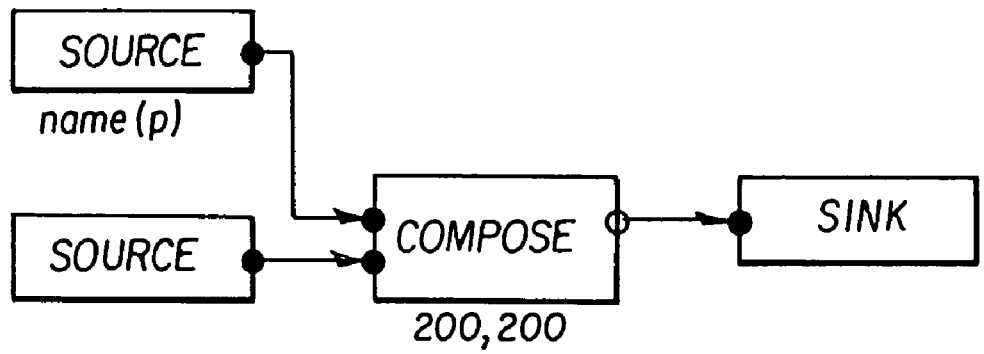
FIG. 4 is a schematic block diagram illustrating a multiple image chain.

Many requests will need to perform processing on more than one image. Yet the image chain representation becomes no more complex. In this example, one image is composed with another—the secondary image is blended, or layered, with the first at the location specified in the chain. The chain is graphically shown in FIG. 4. Since requests are represented as a sequence of commands, the system must use references to other commands to describe a bifurcated chain. The image chain above could be created by a request as follows:

source=url[http://www.liquidpixels.net/images/penguin.gif],name[p]&
    source=url[http://www.liquidpixels.net/images/truff.jpg]&
    composite=compose[Over],image[p],x[200],y[100]&
    sink There are two source commands in this example, with the first one additionally specifying a name argument with the value of 'p'. The additional argument tells the dynamic imaging server to take a penguin.gif image and add it to the pool as an image named 'p'. The second source command does not specify a name—the image is added to the pool as the current image, or '_'.

The composite transform operator requires a composition type specified by the compose argument and the name of an image in the pool to compose with the current image, specified by the image argument. The optional x and y arguments define an offset for the composition. Complete details of all preferred commands and their arguments are provided in the Appendix under "Base Command Set", at 73. The resulting composite image is shown in that attached Appendix, at page 6, Appendix FIG. 9, wherein the image of a penguin is placed over the image of a cat.

As a further example, consider now a small change to the previous example and illustrated by the following.

source=url[http://www.liquidpixels.net/images/truff.jpg],name[cat]&
    source=url[http://www.liquidpixels.net/images/penguin.gif],name[p]&
    select=name[cat]&
    composite=compose[Over],image[p],x[200],y[200]&
    sink There are two differences in this modified example. First, the order of the source commands has been reversed, and both source commands specify image names. Second, there is a new command: select, used to make one of the images in the pool the current image. Functionally, this example is no different from the previous, but it can be easier to understand, since the 'current image' is no longer an inferred assignment.

As noted earlier, system assets can be acquired from many sources. The source of an asset is specified as a uri, with the http://, shttp://, ftp://, gopher:, and file: method types supported. The system and method may be readily expanded to include additional types. For the common network based methods, the asset is retrieved from the location specified by the URI to the dynamic imaging server where they are stored and managed by intelligent caching system. If the original image is altered, it will be re-transferred to the dynamic imaging service, otherwise, once the image is managed, it is not re-transferred unnecessarily. Assets may be added to and managed within the asset pool as discussed in the Appendix under "Resident Assets", at 46.

Vector formats allow for limitless scaling and rotation of imagery without the pixel re-sampling and resulting reduction of quality otherwise necessary. Images can be acquired in an ever-growing list of file formats, including formats that do not represent images as pixels, such as PostScript™, Encapsulated PostScript (EPS) or Simple Vector Graphics (SVG).

Certain situations will warrant the introduction of a new (possibly blank or patterned) image into the image chain. Perhaps a transparent spacer image is needed, or a background on to which text will be drawn. The blank command adds a blank image creation operator to the image chain. The blank command is used to add an operator to the image chain that creates a new solid image in the image pool:

blank=color[red],width[100],height[30]&
    sink

The new image can be created in any color desired, with many standard colors available by name. A complete list of named colors and the format for specifying custom colors is in the Appendix, under "Color Definitions", at 173.

It should be noted that there is a difference between a macro command and a stored chain. Macro commands are executable computer code designed to perform complex, and often custom, operations during image chain creation. Stored chains, on the other hand, allow users to store often used request fragments for simple re-use later.

In the present system, image chains can be stored to disk and can be retrieved from disk or any network accessible location. The ability to store image chains—as portions or complete chains—allows users to amass a library of imaging functions which can be assembled later to perform imaging tasks. Coupled with the use of esoteric metadata and the set command, stored chains can behave as functions, allowing simple URLs to achieve powerful results.

Figure 5:
FIG. 5 illustrates a graphic tab to be generated in accordance with the present invention.
Figure 6:
FIG. 6 illustrates the customization of the graphic tab in FIG. 5 with text data.

As one example, suppose one wished to adorn a set of web pages with section tabs similar to the one illustrated in FIG. 5. With a graphic for the image tag created as an eps file, the following image chain could be used to create a section tab with a section name as shown in FIG. 6.

source=url[file:tab.eps]&
annotate=font[Arial-Roman], pointsize[9],text[Section+One],gravity[Center],fill[black]&
sink=format[GIF] Accordingly, with this simple image chain, section tab images can be easily created for any area of the web site, without needing to create them ahead of time.

Since stored chains are referenced by uri just as any asset, they may be stored within the resident asset pool or any network-accessible web of ftp server. With stored chains, however, this repetitive process can be made simpler. By replacing the text argument in the annotate command with a reference to global esoteric metadata, a portion of this image chain becomes a reusable function stored on the dynamic imaging server. It should be noted that the sink command was omitted from the request.

source=url[file:tab.eps]&
annotate=font[Arial-Roman], pointsize[9], text[global.section],gravity[Center],fill[black]

Image chain fragments can be stored on any server in a file, and can be retrieved as part of a request by using a load command. The set command can be used to assign values to global metadata fields within stored fragments. If the image chain fragment above was stored on a web server http://www.domain.com in the file /chains/tab.chain, then the following image commands could be used to create a tab graphic resulting in a customized tab image:

set=key[section],value[Section+One]&
load=url[http://www.domain.com/chains/tab.chain]&
sink System assets—images, fonts, stored chains—can be retrieved from any valid url. The system supports the file: method within these urls, indicating that the asset should be retrieved from the system resident asset pool. The manipulation of the assest pool will now be described in greater detail.

The system's asset pool is divided into three distinct sections with each matching a corresponding type of data and therefore also matching a class of commands. The source command looks to the art asset pool; commands like annotate, text, mftext, and textcurve look to the fonts asset pool; and the load command looks to the chains asset pool. Additionally, the addprofile command looks to the art asset pool for icc color profiles.

When several dynamic image servers are installed as a cluster, each slave server accesses a synchronized copy of the master's resident asset pools, providing unified access to assets without any reduction in performance. Synchronization occurs on a regular basis, determined during configuration and can also be performed manually at any time. Additional information regarding the resident asset pools, manipulation capabilities, and cluster synchronization can be found in the attached Appendix under "Resident Assets", at 46.

System commands may contain arbitrary mathematical expressions which will be evaluated when the image chain is created from the request. Expressions are enclosed by parenthesis '('and')', and may contain references to image metadata fields. Expressions are an important element of the system's flexibility. They permit image manipulations to be constructed in situations where certain aspects of the source image or the necessary target are not known, or when metacommands are used to make decisions during rendering. Simple expressions are useful to increase clarity within some operation. For example, referring back to the composite example to position the penguin at the center of the underlying cat image, it is necessary to know the size of the cat image, which is information that is not available. However, expressions and image metadata can be used to determine the size.

source=url[http://www.liquidpixels.net/images/penguin.gif], name[p]&
source=url[http://www.liquidpixels.net/images/truff.jpg] &
composite=compose[Over], image[p],x[(_.width/2)],y[(_.height/2)]&
sink It should be noted that the image specified in the second source command above, while not explicitly named, can still be identified by the current image name '_'. The identified image metadata width and height are each used within small expressions to determine the center of the current image (named '_').

Certain characters may not be permitted within a request of a specific form. For example, http requests, present a limited character set due to the use of several characters by the protocol to indicate special meaning. In all cases, however, encoding techniques specific to the representation can be used to overcome this limitation Several Metacommands are also preferably available that perform decision making operations such as if-then, string matching, or time and date determination. These Metacommands all perform by manipulating global metadata, and the results of their operation can be used within expressions. For example, in a more complex casee:

blank=width[600],height[60],name[bg]&
annotate=text[Only],font[Arial-Bold], pointsize[22],fill[black],y[1 35],x[10]&
annotate=text[days+left+till+Christmas],font[Arial-Bold], pointsize[22],
fill[black],y[35],x[150]&
countdown=target[12/25/2001],key[days]&
annotate=text[global.days],font[Dominican], pointsize[36],fill[red],y[40],x[82]&
optimize&
sink=format[gif]

In this example, the number of days remaining until Christmas 2001 is determined by the countdown metacommand supplied as party of the system. The resulting number is placed in the global metadata in a field named days, specified by the key argument in the countdown command. Each time this request is processed, the operators that result may contain different values, based on the number of days remaining. This information is used by the annotate command later in the request to draw a custom message on the image.

Sometimes there are situations where a command within a request should only be executed if a certain criteria is met. Perhaps an image should only be reduced if it exceeds a certain size. Or, perhaps, only images in cmyk should only be converted to rgb. The system's conditional execution of commands allows for command processing to occur only if a criteria is valid.

source=url[http://www.liquidpixels.netimages/Spain.
       jpg],name[image]&
    scale=size[500]&
    addprofile=url[file:profiles/sRGB.icm],
       if[('image.colorspace'ne 'RGB')]&
    sink Any system command may contain an additional special argument, 'if'. when the if argument is present for a command, the value of the if argument is evaluated, and the command will be skipped during processing if the value is numerically zero or blank.

As already mentioned, images have two components: a visible component, represented as pixels, vector information, or instructions, and a non-visible component called metadata. Metadata comes in two forms, image-specific metadata, representing physical aspects of an image (height, width, color depth, format, etc.) and logical aspects of an image (cached, name, etc.) and esoteric metadata, representing any additional information associated with an image by the user. Image-specific metadata is inherent to the image, it can not be changed explicitly, while esoteric metadata can be arbitrarily manipulated as needed. Esoteric metadata can be manipulated by the attribute command. Both types of metadata are available to system commands within a request. There is no distinction made between image and esoteric metadata within a request.

Metadata is accessed by image pool name, followed by a dot '.' and the name of the metadata field desired. For example, the string "cat.width" could be used within a command to determine the width of an image named cat. The current image can also be queried for metadata, even when it is not explicitly named by using an underscore '_' as the image name _.width).

Beyond metadata associated with an image, there is also metadata associated with a request. This metadata, solely esoteric, can be used to pass information between commands in a request, much as variables are used in programming languages. Request-centric metadata is known as Global metadata, and is accessed via a special image name global. Esoteric metadata can be set globally or specifically for an image by using the set metacommand, or by certain other metacommands and macros that may make decisions or calculations earlier in a request.

Two forms of image-specific metadata are detected and extracted by the system for use in image chains: iptc metadata and exif metadata. The International Press Telecommunications Council, or IPTC, defines a format for the exchange of metadata in news content including photographs. Many desktop imaging applications allow you to add iptc metadata to your images, or view any data already in place. The iptc metadata fields are listed in "IPTC Metadata" on page 193. The exif, or Exchangeable Image File, defines a common format for image interchange in use by most digital cameras on the market today. Along with the image capture, devices supporting exif will populate the exif metadata fields with camera-and possibly location-specific information known at the time of capture. The exif metadata fields are listed in the attached Appendix under "EXIF Metadata", at 196. Both exif and iptc metadata can appear in an image together.

Non-Imaging commands are commands which, when executed, result in the addition of zero or more new operators added to the image chain. They differ from basic commands in that they do not perform imaging operations themselves. Rather, they are useful to make decisions, fetch data from an external source, perform repetitive commands, and to reduce complex, yet often-repeated imaging operations into a simple single command. Non-imaging commands can be separated into two categories: metacommands and macros. Metacommands are commands intended to manipulate metadata. Macros appears as any other command within a request, but may be designed to perform complex computations, database access, or other computations as precursor steps to adding zero or more operations to the image chain, or setting esoteric metadata. A macro may, for example, be developed to query a database of product information and set esoteric metadata to the current price. This metadata could then be used later in the request to image sale information on the image, or as the basis for conditional execution of a command.

Certain macros are simple conveniences. For example, the most common use for the system may be to create an image containing styled text rendered in an attractive typeface can be simplified via a macro. Without a macro three steps are required: first, determine the size of the text to be rendered, in pixels; second, create a new blank image of that (or slightly larger) size; and third, render the text onto the new blank image. The text macro does just this: it calculates the bounding box for the text to be rendered, and then adds two new operators to the image chain: a blank operator and an annotate operator.

In most environments, there is no need to restrict access to the dynamic imaging server or a cluster of servers. Some environments, however, will require certain restrictions to be placed on access to the server. There are two mechanisms by which access to a dynamic image server are preferably restricted: referring host, and keyed requests.

The referring host method is most applicable to websites using the system for imaging within their own environments or a limited number of external environments. It is not a desirable mechanism for securing access within the arena of HTML e-mail. When a web browser makes a request to a server, it sends with the request information describing the HTML resource that referred the request. When following a link from one HTML page to another, for example, the browser informs the web server of the URL from which the second page is accessed. When a browser makes a request for an image, the web browser will inform the server the URL of the page containing the image tag. It is this information that the system uses to restrict use of the dynamic imaging server by alien sites. The system is presented with a list of server names (or URLs) for which requests are permitted. Once the list is complete, and host based security is enabled, any attempts to access the server via an image tag served by a server not listed will not be permitted. Operation is transparent when the request is made from a web browser, even under JavaScript control.

When keyed requests are made from a non-browser environment—html e-mail, a Java applet, an application—the referrer information used in host based security is not present. In this case, an additional command must be added to the chain containing a key, unlocking the system for that request. A unique key is created for each request to be made; keys are based on the image chain itself, and a 'secret' known to the system operator.

The system preferably maintains two separate cache systems: an asset cache, for source images, fonts, profiles, and stored chains; and a render cache, for rendered images. Both caches perform the same basic function, to keep recently accessed data near-by such that subsequent accesses are as rapid as possible. When any asset is requested via url in a command such as source or annotate, the asset is retrieved from the location specified and stored within the asset cache.

Subsequent requests for the same asset will use this cached copy, saving the overhead of the network retrieval. In clustered environments, the asset cache is automatically synchronized to appear as a single, unified, transparent cache. The render cache is used to accelerate repeat requests for a chain, serving the cached result rather than re-render the image. The decision to return a cached image is based on the request; requests must match exactly to cause a cached.

The command structure and processing operations for a system in accordance with the present invention have been described in detail, and additional information can be found in the Appendix attached hereto which forms part of this specification. Specific implementation examples will now be discussed.

Figure 7:
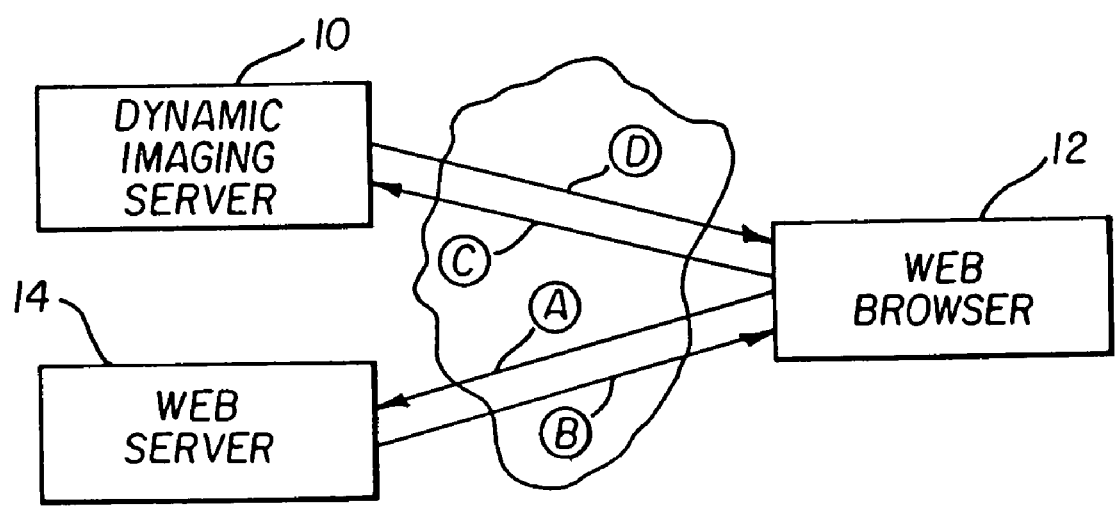
FIG. 7 is a schematic block diagram illustrating the use of a dynamic imaging server in an Internet application.

Referring now to FIG. 7, a schematic block diagram is shown illustrating the use of a dynamic imaging server 10 in an Internet application. In conventional Web operation, a World Wide Web browser 12 contacts a web server 14 via a network 16 such as the Internet, requesting, an HTML resource or page that is available on the web server 14. The request is illustrated in the drawing by arrow A. The page, composed in HTML, includes image tags containing HREFs pointing to the dynamic imaging server 10 and an image chain is returned to the browser 12 as illustrated by arrow B. The browser 12 parses the HTML, and makes subsequent requests back via the network 16 to obtain data for all images referred to by the image tags. When a tag referencing the dynamic imaging server 10 is requested, an HTTP request is sent via the network 16 to the dynamic imaging server 10 where it is parsed into a job as illustrated by arrow C. The job is processed and the newly created custom image is returned via HTTP by the dynamic imaging server 10 via the network 16 to the requesting browser 12 for display.

Figure 8:
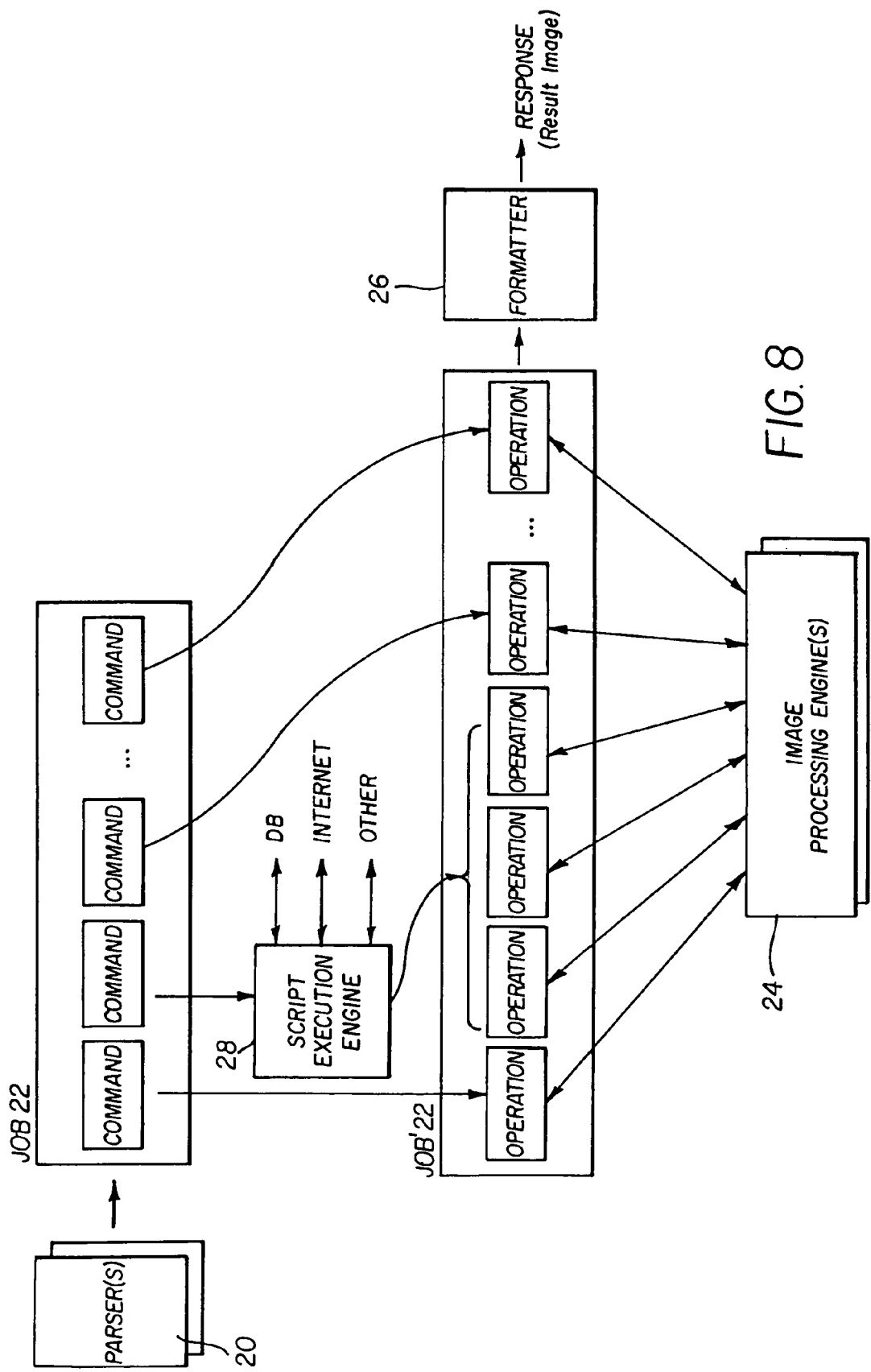
FIG. 8 is a functional block diagram of the dynamic imaging server illustrated in FIG. 7.

FIG. 8 is a functional block diagram illustrating the dynamic image server 10. The dynamic imaging server 10 includes a parser 20 that parses the incoming request into a job 22 having one or more associated commands as previously described above. An existing URI parser can be easily augmented with additional parsers for XML and other types of requests. Accordingly, the parsing and command creation process is extensible such that new functionality can be added to the system over time. The job 22 is then executed one command at a time to perform various operations by a job processor. The performance of the operations is shown for purposes of illustration as job 22'. The operations may require the use of one or more imaging engines 24 contained with the dynamic imaging server 10 in order to manipulate or create the image as described in the request.

As one example, a first command may require the dynamic imaging server to obtain a source image from a tertiary web server at a specified URL. The dynamic imaging server 10 makes this request, and uses the returned image as the starting point for the image processing process. A second command may then require the dynamic imaging server 10 to scale the image to 50% of its original size, which the dynamic imaging server 10 accomplishes by utilizing an appropriate image processing engine. Finally, a further command may require the dynamic imaging server 10 to format the new image into a specific image format, such as a JPEG image, which the dynamic imaging server 10 accomplishes using a formatter 26.

The dynamic imaging server 10 also preferably includes a script execution engine 28 that can execute arbitrary code during a job execution. The command may require, for example, that information be retrieved from a remote site— like a stock quotation—or that another image element—for example a grid pattern—be generated for insertion into the image to be created. The script execution engine 28 executes these types of instructions to obtain the necessary data to be inserted into the image.

As will be readily appreciated, the above-described dynamic imaging server can be utilized in a number of applications, just one of which includes providing customized images for email users. For example, an HTML email is sent to a recipient containing image tags containing HREFs pointing to a dynamic imaging server and an image chain. The mail server at the point of origin forwards the email to one or more mail servers between originator and addressee. Ultimately, the email message sits on the recipient's mail server. Periodically the recipient's email client fetches mail from the server. The server sends requested messages to the email client. The email client, upon discovering HTML email content, parses the HTML. For each image tag discovered, the email client makes additional requests to the specified locations for image data. If the HREF for the image tag refers to the dynamic imaging server, the request is sent to the server and parsed to create a job that is processed to return an image.

Figure 9:
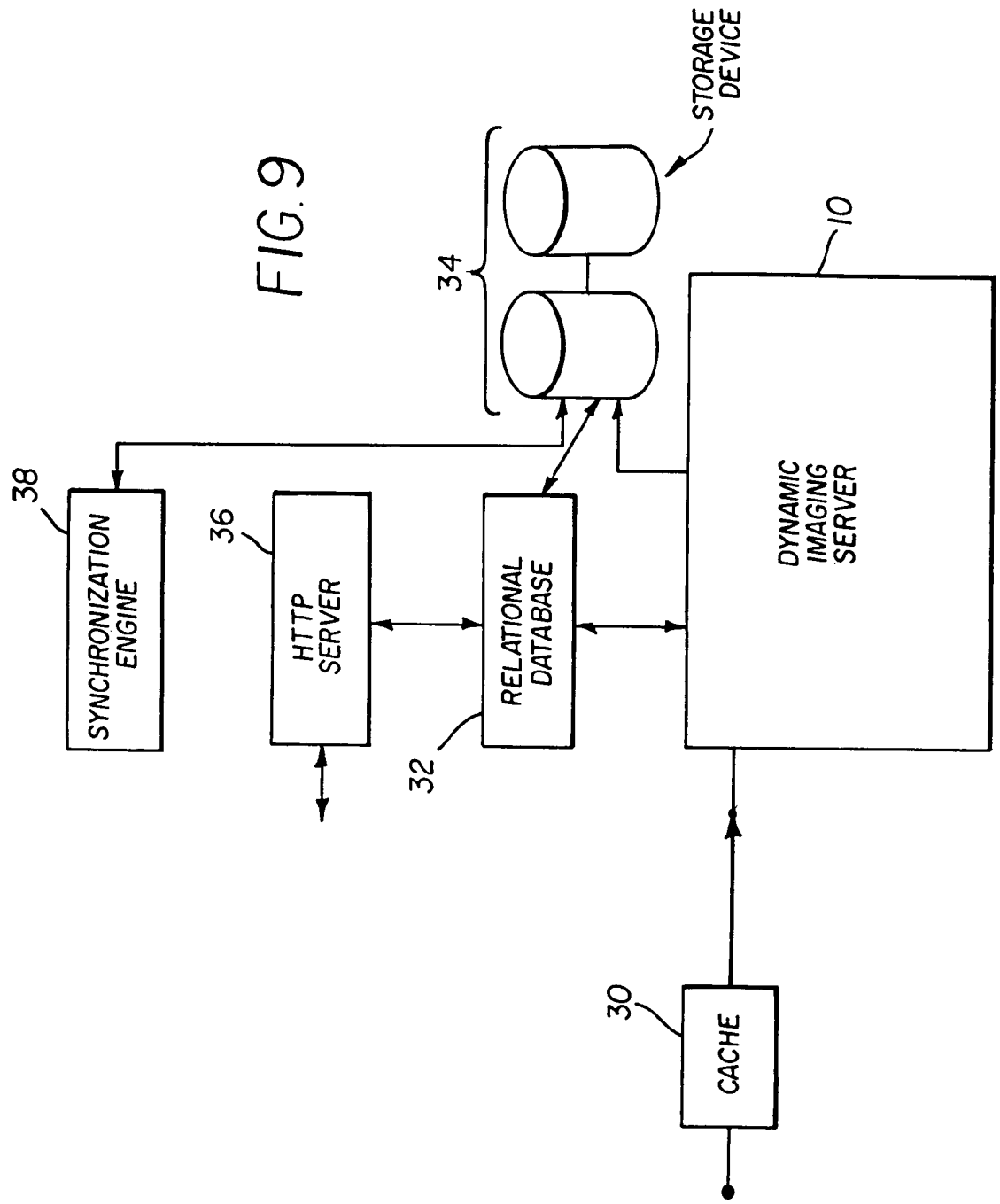
FIG. 9 illustrates a single node of a dynamic imaging system in accordance with the invention.

Referring now to FIG. 9, a system overview illustrating the implementation of the dynamic imaging server 10 into an overall dynamic imaging system in the form of a basic node. The basic node includes the dynamic imaging server 10 coupled to an input request cache 30, a relational database 32, and a storage device 34. The input request cache 30 is used to cache requests, wherein a subsequent request for an image that has already been created need not be processed by the dynamic imaging server 10. Instead, the image can be retrieved directly from the storage. New requests are forwarded to the dynamic imaging server 10 for processing. During the process of the request, the dynamic imaging server 10 may need to acquire a particular asset or other information. The dynamic imaging server 10 can query the relational database 32 to determine the location and availability of the asset. If the asset is not maintained on the local storage device 34, an HTTP server 36 can be utilized to retrieve the asset. The HTTP server 36 can also be utilized to allow for configuring of the dynamic imaging server 10 as explained in the attached Appendix. Finally, a synchronization engine 38 is provided to synchronize transfer of files from other sources to and from the local storage device 34.

Figure 10:
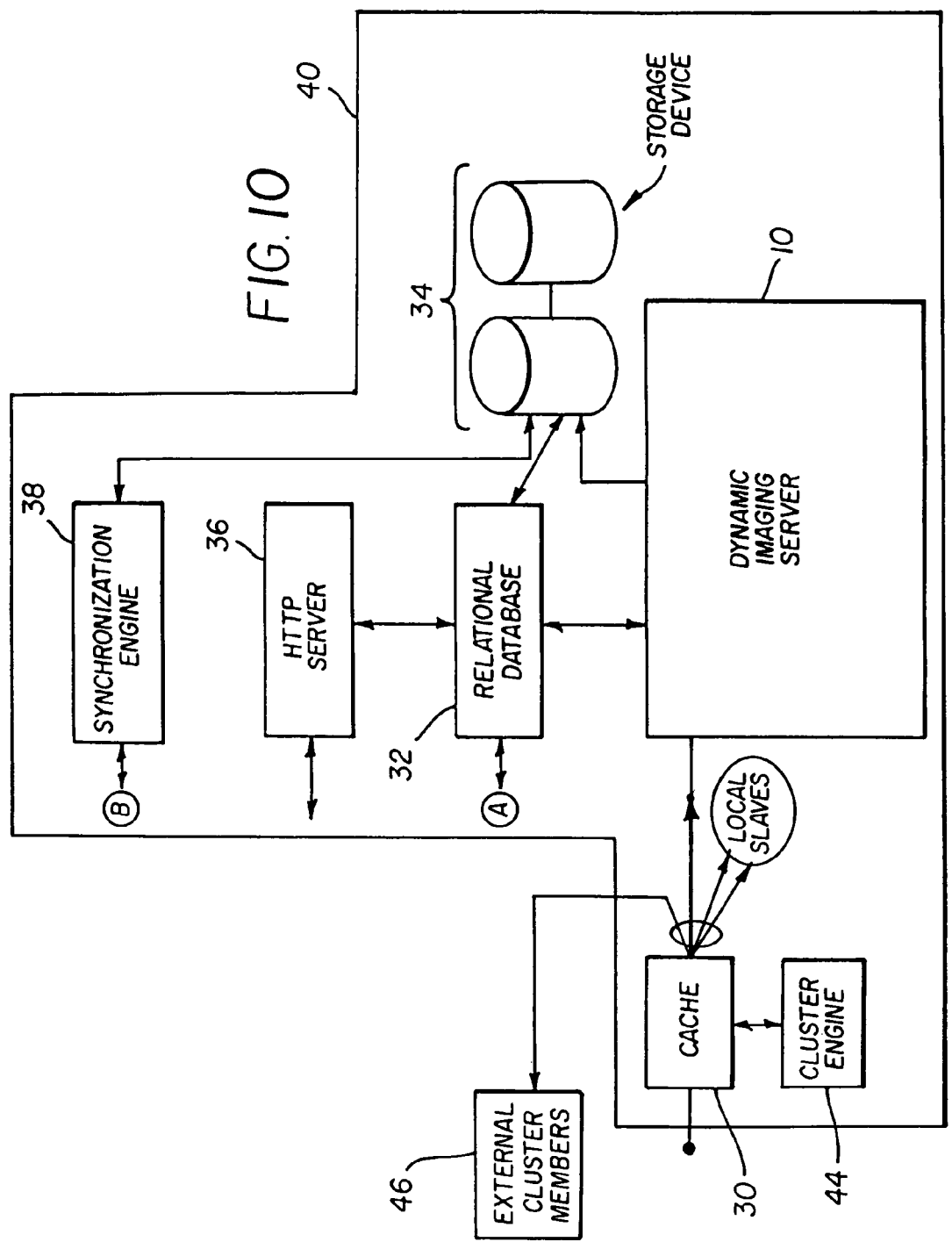
FIG. 10 illustrates a cluster master for a dynamic imaging system in accordance with the invention.
Figure 11:
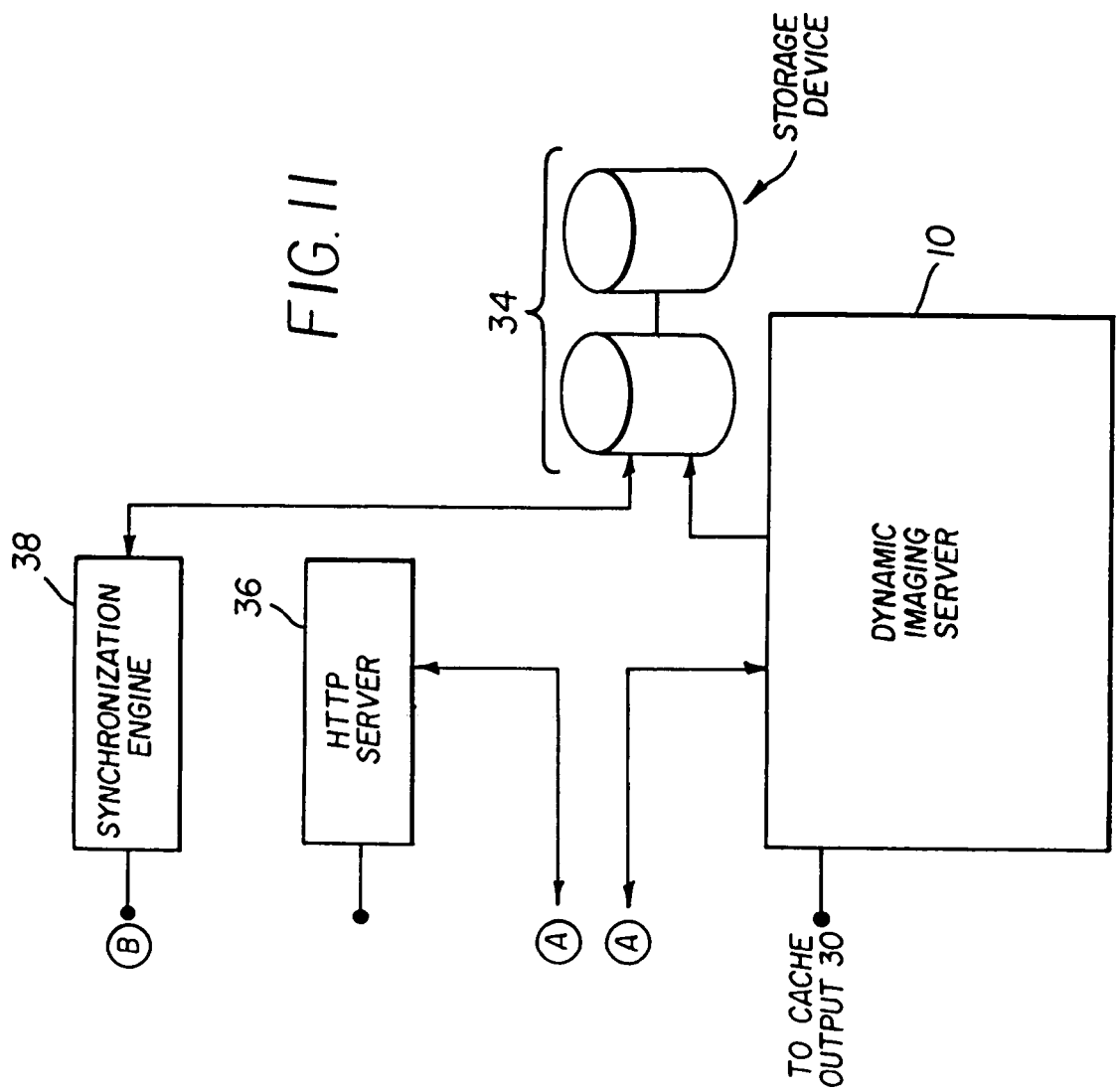
FIG. 11 illustrates a cluster slave for a dynamic imaging system in accordance with the invention.

The architecture of the dynamic imaging system provides a great deal of flexibility in coupling multiple dynamic image servers 10 together depending on the requirements of a particular application. Multiple dynamic imaging servers 10, for example, can be linked together to form a cluster. For example, FIG. 10 illustrates a cluster master 40 that includes a cluster engine 44 in addition to the same elements of the basic node discussed above, while FIG. 11 illustrates a cluster slave 42 that is coupled to the cluster master 40. The cluster slave 42 also includes the elements of the basic node set forth above, with the exception of the relational database 34. The cluster engine 44 monitors the requests and determines which dynamic imaging server 10 within the cluster is best suited to handle the particular request. Accordingly, the cluster engine 44 acts to direct the flow of requests to the device most suited to handle that particular request.

As also noted in FIG. 10, the requests may be directed to external cluster members 46. In other words, each individual cluster may have at least one master and one or more slaves, and each individual cluster can be linked to another external cluster. The ability to link clusters together provides a great deal of application flexibility. In an electronic commerce application, for example, a user may have a cluster including several slave devices that are generally sufficient to meet the user's requirements during most periods of the year. In peak periods, however, the user may need additional processing capability. Instead of expanding the number of devices in its own cluster, the user can utilize the resources of other external clusters. The external clusters could be the user's own external cluster located at a different geographic locations or—in a preferred application—may be the cluster of a third party provider that leases or sells excess processing capability to the user. Providing this overflow processing capability permits the user to avoid the expense of purchasing and maintaining equipment that is not need for most of the year, while maintaining sufficient capacity during peak periods.

The factors used by the cluster engine 40 to determine request flow may include a number of parameters and is generally dependent on the particular application. As just one simple example, the cluster engine 40 determines which device in the cluster is currently idle and directs the next request to the idle device. It will be readily appreciated by those skilled in the art that the actual parameters to be utilized will be application specific but could include: geographic location of clusters; cluster processing loads; cluster data transfer capabilities; time variables; and the nature of the request to be processed.

The invention has been described with reference to certain preferred embodiments thereof. It will be understood, however, that modifications and variations are possible with the scope of the appended claims. As just one example, although the description of the detailed embodiments of the invention referred to the manipulation of image data, the invention is also applicable to other types of data including audio data. Accordingly, the principles of the invention are applicable to enabling an dynamic audio server that dynamically creates audio files in response to audio requests.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyrights rights whatsoever.

What is claimed is:

1. A dynamic imaging server that dynamically generates on-demand digital images on a per request basis, said dynamic imaging server comprising:
    a parser that receives an image generation request and interprets the image generation request into a set of individualized image generation operation commands that are executable to create or alter an image;
    a job processor that receives the set of individualized image generation operation commands from the parser and sequentially executes the set of individualized image generation operation commands in the form of a image generation job;
    a script execution engine that executes code during execution of the job by the job processor;
    at least one image processing engine that performs at least one image generation operation in response to at least one image generation command contained in the image generation job to generate processed image data corresponding to the image generation request; and
    a formatter that receives the processed image data from the image processing engine and formats the processed image data into a result image of a desired image format;
    wherein the result image is dynamically generated in response to the image generation request.

2. A dynamic imaging system that dynamically generates on-demand digital images on a per request basis, said dynamic imaging system comprising:
    a storage device;
    a dynamic imaging server coupled to a storage device;
    a database accessible by the dynamic imaging server; and
    a network server;
    wherein the dynamic imaging server comprises:
        a parser that receives an image generation request and interprets the image generation request into a set of individualized image generation operation commands that are executable to create or alter an image;
        a job processor that receives the set of individualized image generation operation commands from the parser and sequentially executes the set of individualized image generation operation commands in the form of a image generation job;
        a script execution engine that executes code during execution of the job by the job processor;
        at least one image processing engine that performs at least one image generation operation in response to at least one image generation command contained in the image generation job to generate processed image data corresponding to the image generation request; and
        a formatter that receives the processed image data from the image processing engine and formats the processed image data into a result image of a desired image format;
        wherein the result image is dynamically generated in response to the image generation request.

3. A dynamic imaging system as claimed in claim 2, further comprising a request cache that receives image requests and determines whether the image request should be forwarded to the dynamic imaging server for processing.

4. A dynamic imaging system that dynamically generates on-demand digital images on a per request basis, said dynamic imaging system comprising:
    at least one cluster, said cluster including:
        at least one cluster master device ; and
        at least one cluster slave device;
    wherein the cluster master device comprises:
        a storage device;
        a dynamic imaging server coupled to a storage device;
        a database accessible by the dynamic imaging server;
        a network server; and
        a cluster engine;
    wherein the cluster slave device includes:
        a storage device;
        a dynamic imaging server coupled to a storage device; and
        a network server;
    wherein the cluster engine manages a flow of image requests between the cluster master and the cluster slave; and
    wherein the dynamic imaging server of the cluster master and the dynamic imaging server of the cluster slave each comprise:
        a parser that receives an image generation request and interprets the image generation request into a set of individualized image generation operation commands that are executable to create or alter an image;
        a job processor that receives the set of individualized image generation operation commands from the parser and sequentially executes the set of individualized image generation operation commands in the form of a image generation job;

a script execution engine that executes code during execution of the job by the job processor;

at least one image processing engine that performs at least one image generation operation in response to at least one image generation command contained in the image generation job to generate processed image data corresponding to the image generation request; and a formatter that receives the processed image data from the image processing engine and formats the processed image data into a result image of a desired image format;

wherein the result image is dynamically generated in response to the image generation request.

5. A dynamic imaging system as claimed in claim 4, wherein the dynamic imaging server of the cluster master and the dynamic imaging server of the cluster slave each further comprise a script execution engine capable of executing code during execution of the job.

6. The dynamic imaging system as claimed in claim 4, further comprising a plurality of said clusters.

* * * * *